United States Patent
Scheidegger et al.

(10) Patent No.: US 9,681,524 B2
(45) Date of Patent: Jun. 13, 2017

(54) START UP CIRCUIT FOR DIGITAL ADDRESSABLE LIGHTING INTERFACE STAND BY COMPATIBLE DRIVER

(71) Applicant: GE Lighting Solutions, LLC, East Cleveland, OH (US)

(72) Inventors: Carre Denise Scheidegger, East Cleveland, OH (US); Gang Yao, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 131 days.

(21) Appl. No.: 14/623,530

(22) Filed: Feb. 17, 2015

(65) Prior Publication Data
US 2016/0242267 A1     Aug. 18, 2016

(51) Int. Cl.
  H05B 37/02    (2006.01)
  H04B 3/50     (2006.01)
  H04L 12/40    (2006.01)

(52) U.S. Cl.
  CPC .......... *H05B 37/0281* (2013.01); *H04B 3/50* (2013.01); *H04L 12/40* (2013.01); *H05B 37/0254* (2013.01)

(58) Field of Classification Search
  CPC ................................................ H05B 37/0281
  USPC ......................................................... 307/70
  See application file for complete search history.

(56) References Cited

U.S. PATENT DOCUMENTS

| 7,518,434 | B1* | 4/2009 | Jurasek ..................... G05F 3/08 327/538 |
| 2008/0061634 | A1* | 3/2008 | Iwata ..................... H01H 9/542 307/141 |
| 2009/0189442 | A1 | 7/2009 | Chi |
| 2012/0025608 | A1 | 2/2012 | Melanson et al. |
| 2012/0262080 | A1* | 10/2012 | Watanabe .......... H05B 33/0818 315/210 |
| 2014/0119059 | A1 | 5/2014 | Mao |
| 2014/0247074 | A1* | 9/2014 | Matsushita .......... H03K 23/667 327/115 |

FOREIGN PATENT DOCUMENTS

WO      2014175897 A2     10/2014

OTHER PUBLICATIONS

European Search Report and Written Opinion issued in connection with corresponding PCT/US2015/065427 on May 18, 2016.

* cited by examiner

*Primary Examiner* — Scott Bauer
(74) *Attorney, Agent, or Firm* — GE Global Patent Operation; Peter T. DiMauro

(57) ABSTRACT

A power supply includes a first component arrangement providing a first current output for initializing control circuitry, and a second component arrangement providing a second current output to the control circuitry when the control circuitry initialization is complete, and a method of operating a power supply includes connecting a first component arrangement of the power supply to provide control circuitry with a first current for initializing operations within a predetermined time period, and connecting a second component arrangement of the supply to provide the control circuitry with a second current when initializing operations are complete.

15 Claims, 5 Drawing Sheets

START UP CIRCUIT FOR DIGITAL ADDRESSABLE LIGHTING INTERFACE STAND BY COMPATIBLE DRIVER

The disclosed exemplary embodiments relate generally to lighting control systems, and more particularly to a startup and stand by conditions for addressable lighting systems.

BACKGROUND

Lighting for homes, offices, commercial spaces, and public areas may be controlled to account for occupancy and ambient light at the light fixture, workstation, room, floor and building levels. Various systems have been implemented using the Digital Addressable Lighting Interface (DALI) which is a global standard for a lighting control data protocol and transport mechanism maintained as IEC 62386. The DALI standard specifies a two wire, bi-directional data bus connecting a DALI application controller with up to 64 DALI control gear items and control devices, such as ballasts, drivers, transformers, occupancy sensors, photo sensors, wall switches, and dimmers. The data bus cable is mains rated and may be run next to mains conductors or in a cable with mains conductors. The DALI control gear are individually addressable and data is transferred between the application controller and the control gear using an asynchronous, half-duplex, serial protocol. Data is transmitted using Manchester encoding at a fixed data transfer rate of 1200 bits/s to ensure reliable communications. The DALI bi-directional data bus also provides power at 16 volts and 250 mA maximum current. DALI application controllers and control gear may be connected in a star or daisy chain configuration.

FIG. 1 shows a block diagram of an exemplary DALI system 100. An application controller 105 is connected to a number of control gear items $110_0$-$110_{63}$ by the bi-directional data bus 115. Control gear items $110_0$-$110_{63}$ may control light sources 125 or other equipment. Mains power is provided through mains cable 120. In some implementations, mains power is provided by or controlled by application controller 105.

FIG. 2 shows a schematic diagram of at least a portion of an exemplary DALI control gear 205 similar to control gear $110_0$-$110_{63}$. DALI control gear 205 may include a bus interface 210 and operating circuitry 215. Bus interface 210 may isolate the operating circuitry 215 from the bi-directional data bus 115 using a diode bridge 240 and optocouplers. For example, optocoupler 220R may be used for receiving commands or messages from application controller 105 to the control gear 205, while optocoupler 220T may be used for transmitting responses and messages from the control gear 205 to the application controller 105. The control gear 205 may include a computer 225, for example, a single chip microcontroller with a processor and memory 230 for exchanging information over the DALI bi-directional data bus 115 and for controlling lamps and other lighting equipment.

FIG. 3 shows a schematic diagram of at least a portion of an exemplary power supply 300 for providing power to DALI control gear circuitry. The exemplary supply is capable of providing one or more outputs, for example, +5V and Vcc. The exemplary control gear power supply 300 includes a partially shown rectifier circuit 305 and switches 310, 315, and 320. While switches 310, 315, and 320 may be implemented as semiconductors, for example, transistors, field effect transistors (FETs), metal oxide semiconductor field effect transistors (MOSFETs), in this example, switches 310, 315, and 320 are N-channel MOSFETs.

After initial turn on, the +5V supply may be generated directly from an output 325 of the rectifier circuit 305 and the Vcc supply may be generated from the output 325 through switch 310 controlled by switches 315 and 320. After the output 325 stabilizes and Vcc is established, the supplied control gear reaches steady state operations, that is, operations that implement DALI functions. At some point, a standby signal may be received at input 330. Upon receipt of the standby signal, switch 315 will conduct, forcing the gate of switch 310 to a level causing switch 310 to open, removing power from Vcc. In addition, switch 320 will conduct, forcing Vcc to a low level. In this example, when the standby signal received, the +5 v supply remains at full power capacity and Vcc is substantially disabled.

DALI standards set limits on circuit initialization times after power is applied. In addition, DALI standards also set limits on power consumed by control gear components during different modes of operation after initialization is complete. For example, power consumption may be held at a lower level when the control gear is operating in standby mode.

It would be advantageous to provide a power supply capable of operating in various modes, for example, an increased power mode that allows control gear components to complete initialization during a specified time period, and a decreased power mode that limits power available to control gear components after initialization and when operating in standby mode.

SUMMARY

The disclosed embodiments are directed to a power supply including a first component arrangement providing a first current output for initializing control circuitry, and a second component arrangement providing a second current output to the control circuitry when the control circuitry initialization is complete.

In some aspects of the disclosed embodiments, the control circuitry comprises digital addressable lighting interface control gear circuitry.

In certain aspects of the disclosed embodiments, the first current output is higher than the second current output.

In at least one aspect of the disclosed embodiments, components of the first component arrangement are selected to provide a predetermined initialization time.

In one or more aspects of the disclosed embodiments the first and second component arrangements are resistor networks.

The disclosed embodiments may include a switch for selecting between the first and second component arrangements.

The disclosed embodiments may also include switching circuitry for controlling the switch to select the first component arrangement upon an application of power to the control circuitry, and to select the second component arrangement when the control circuitry initialization is complete.

In some aspects of the disclosed embodiments, the switching circuitry may be configured to control the switch to select the second component arrangement upon receiving a standby mode signal.

The disclosed embodiments are further directed to a method of operating a power supply including connecting a first component arrangement of the power supply to provide control circuitry with a first current for initializing operations within a predetermined time period, and connecting a second component arrangement of the supply to provide the control circuitry with a second current when initializing operations are complete.

In some aspects of the disclosed embodiments, the control circuitry of the method comprises digital addressable lighting interface control gear circuitry.

In certain aspects of the disclosed embodiments, the first current output of the method is higher than the second current output of the method.

At least one aspect of the disclosed embodiments includes selecting components of the first component arrangement to provide a predetermined initialization time.

In one or more aspects of the disclosed embodiments, the first and second component arrangements of the method are resistor networks.

The disclosed embodiments may include selecting the first component arrangement upon an application of power to the control circuitry, and selecting the second component arrangement when the control circuitry initialization is complete.

The disclosed embodiments may also include selecting the second component arrangement upon receiving a standby mode signal.

DETAILED DESCRIPTION

The embodiments disclosed herein provide control gear components with different levels of power for different operating modes. In one or more aspects, the present embodiments utilize a switching circuit to vary power available to control gear components.

Figure 4:
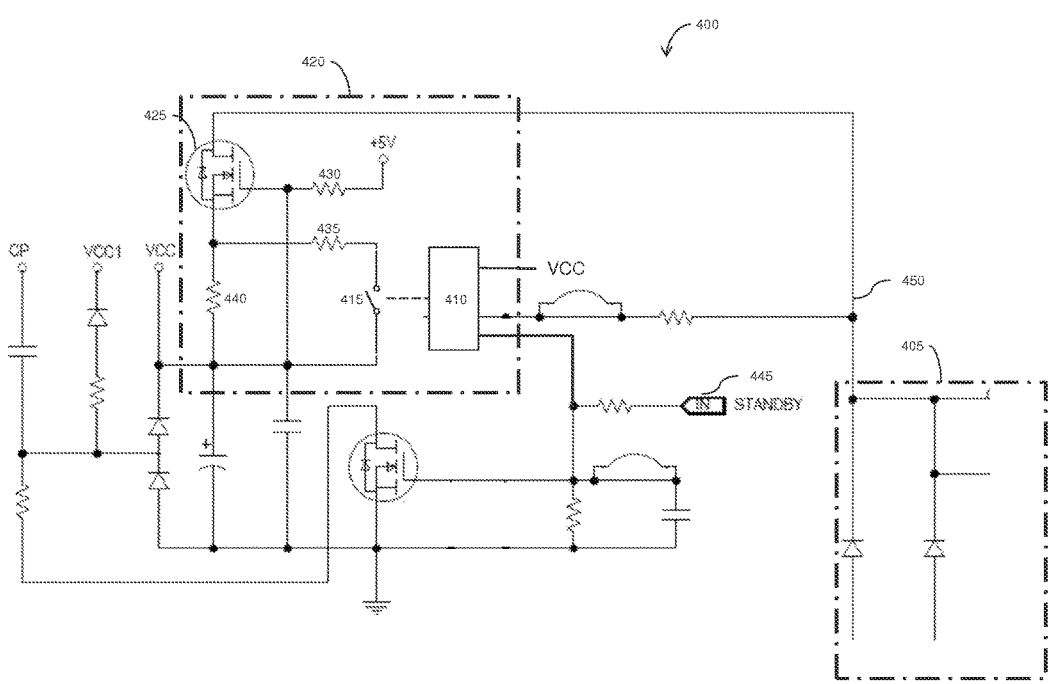
FIG. 4 is a schematic diagram of an exemplary DALI control gear power supply incorporating the disclosed embodiments.

FIG. 4 is a schematic diagram of an exemplary DALI control gear power supply 400 incorporating the structures and techniques disclosed herein. The control gear power supply includes a partially shown rectifier 405 connected to a current supply 420. As part of the current supply 420, a semiconductor component 425 may be configured to supply a current determined by resistors 430, 435, and 440. The control gear power supply 400 also includes a switching circuit 410 controlling a switch 415 connected to the current supply 420. Inputs to the switching circuit 410 include Vcc, rectifier 405 and a standby input signal 445.

Upon turn-on, rectifier 405 produces power which is provided to current supply 420 and to switching circuit 410 through node 450. When node 450 transitions to an active level, switching circuit 410 is triggered and causes switch 415 to close, connecting resistors 435 and 440 in parallel. This results in a decreased resistance between the semiconductor component 425 and Vcc, and an increase in the current supplied by current supply 420 to both Vcc and +5V. The increased current is supplied to control gear components during initialization allowing the components to complete initialization within a predetermined time period. In at least one embodiment, the values of resistors 430, 435, and 440 may be chosen to provide a particular amount of current during initialization. Switch 415 and semiconductor component 425 may include one or more transistors or other semiconductor switching devices. In at least one embodiment, switch 415 and semiconductor component 425 may be implemented using at least one N-channel FET or MOSFET.

After Vcc reaches a stable operating level, switching circuit 410 operates to open switch 415, disconnecting resistor 435, resulting in an increased resistance between semiconductor component 425 and Vcc and a decrease in the current supplied by current supply 420. The decreased current may be maintained during control gear steady state operations or during an automatic reset that may be triggered if Vcc drops below a predetermined value.

Switching circuit 410 may receive a standby signal on input 445, indicating that the control gear is to be operated in a standby mode. Standby mode operation may include operating the control gear at a reduced power consumption rate while maintaining a communication capability with the application controller 105. For example, standby mode operation could include providing power to communication circuitry within the control gear such as bus interface 210, optocouplers 220R, 220T, and operating control circuitry 215. Upon receiving the standby signal on input 445, switching circuit 410 operates to maintain switch 415 in an open state. This effectively maintains the current supplied by current supply 420 at the reduced rate.

Figure 5:
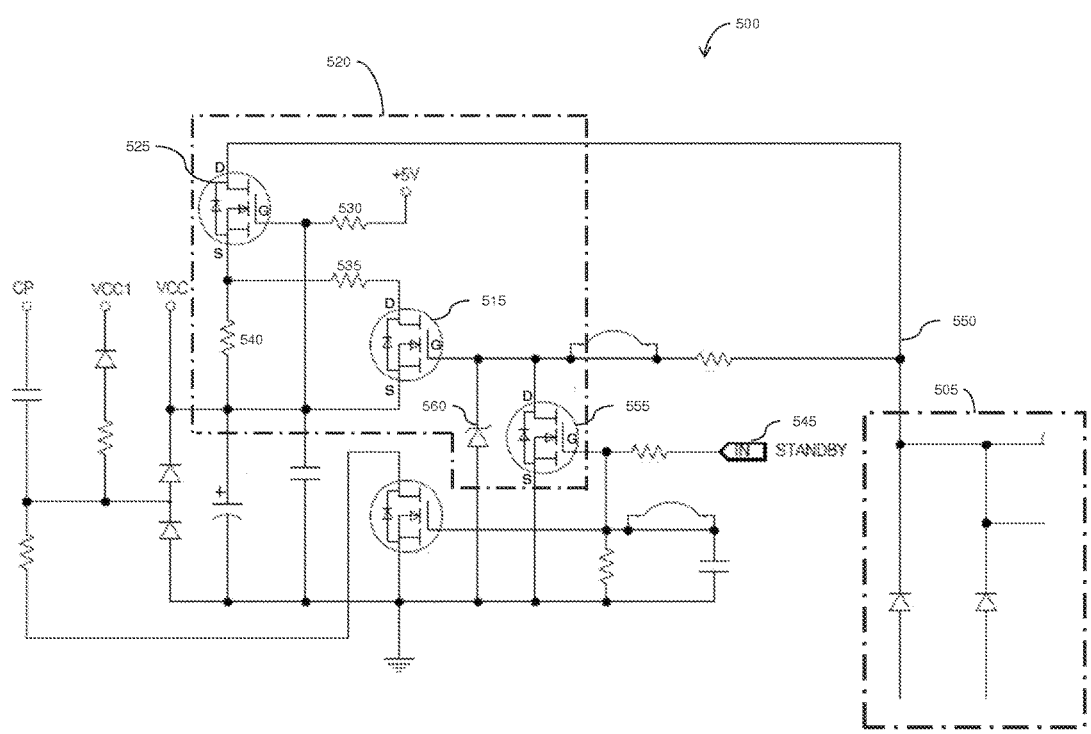
FIG. 5 shows another example of an exemplary DALI control gear power supply according to the disclosed embodiments.

FIG. 5 shows another embodiment of an exemplary DALI control gear power supply 500 incorporating the structures and techniques disclosed herein. The control gear power supply 500 includes a partially shown rectifier 505 and a current supply 520. As part of current supply 520, a semiconductor component 525 may be configured to supply a current determined by resistors 530, 535, and 540. Semiconductor component 525 may include one or more transistors or other semiconductor switching devices.

The control gear power supply 500 also includes an exemplary embodiment of switching circuit 410 and switch 415. In this embodiment, switching circuit 410 includes semiconductor switching device 515, zener diode 560, and semiconductor switching device 555. In at least one aspect of the disclosed embodiments, semiconductor components 525, 515 and 555 may be implemented using one or more N-channel FETs, however, it should be understood that any device suitable for use in the disclosed embodiments may be used.

Upon turn-on, rectifier 505 produces power which is provided to current supply 520 and to switching circuit 510 through node 550. When node 550 transitions to an active level, the active level signal is provided to a gate G of semiconductor switching device 515 causing the device 515 to conduct, connecting resistors 535 and 540 in parallel. This results in a decreased resistance between a source S of the semiconductor component 525 and Vcc, and an increase in the current supplied by current supply 520. The increased current provided to Vcc operates to decrease the start-up time of components supplied by Vcc.

As the output of the rectifier 505 increases to a stable operating level, zener diode 560 operates to clamp the voltage at the gate of semiconductor switching device 515. As Vcc approaches a stable operating level, a voltage across the gate G and source S of semiconductor switching device 515 decreases causing semiconductor switching device 515 to open, disconnecting resistor 535 from the parallel circuit with resistor 540. As a result, resistance between semiconductor component 525 and Vcc increases and the current supplied by current supply 520 decreases. The resulting decreased current may be maintained during control gear steady state operations.

A standby signal may be received on input 545, indicating that the control gear is to be operated in a standby mode. In standby mode, the control gear generally operates at a reduced power consumption rate while maintaining a communication capability with the application controller 105. As mentioned above, standby mode operation could include providing power to communication circuitry within the control gear such as bus interface 210, optocouplers 220R, 220T, and operating control circuitry 215. The standby signal on input 545 causes semiconductor switching device 555 to conduct, forcing the voltage at gate G of semiconductor switching device 515 to a level for maintaining switch 515 in an open state, and maintaining the reduced current output operation of the current supply 520 at the reduced rate.

Figure 1:
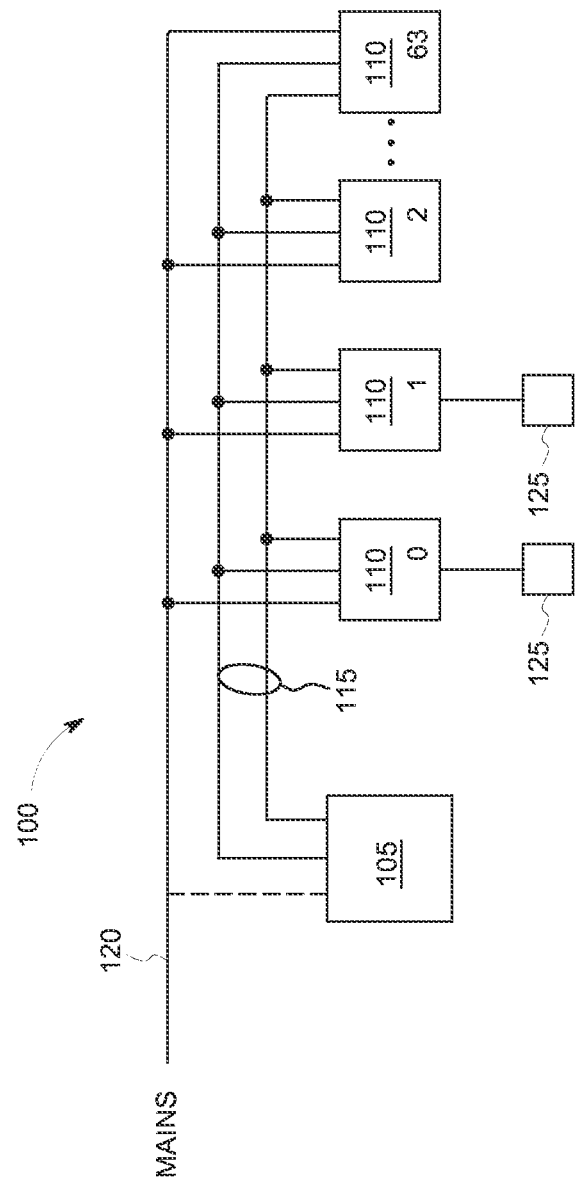
FIG. 1 shows a block diagram of an exemplary prior art digital addressable lighting interface (DALI) system.
Figure 2:
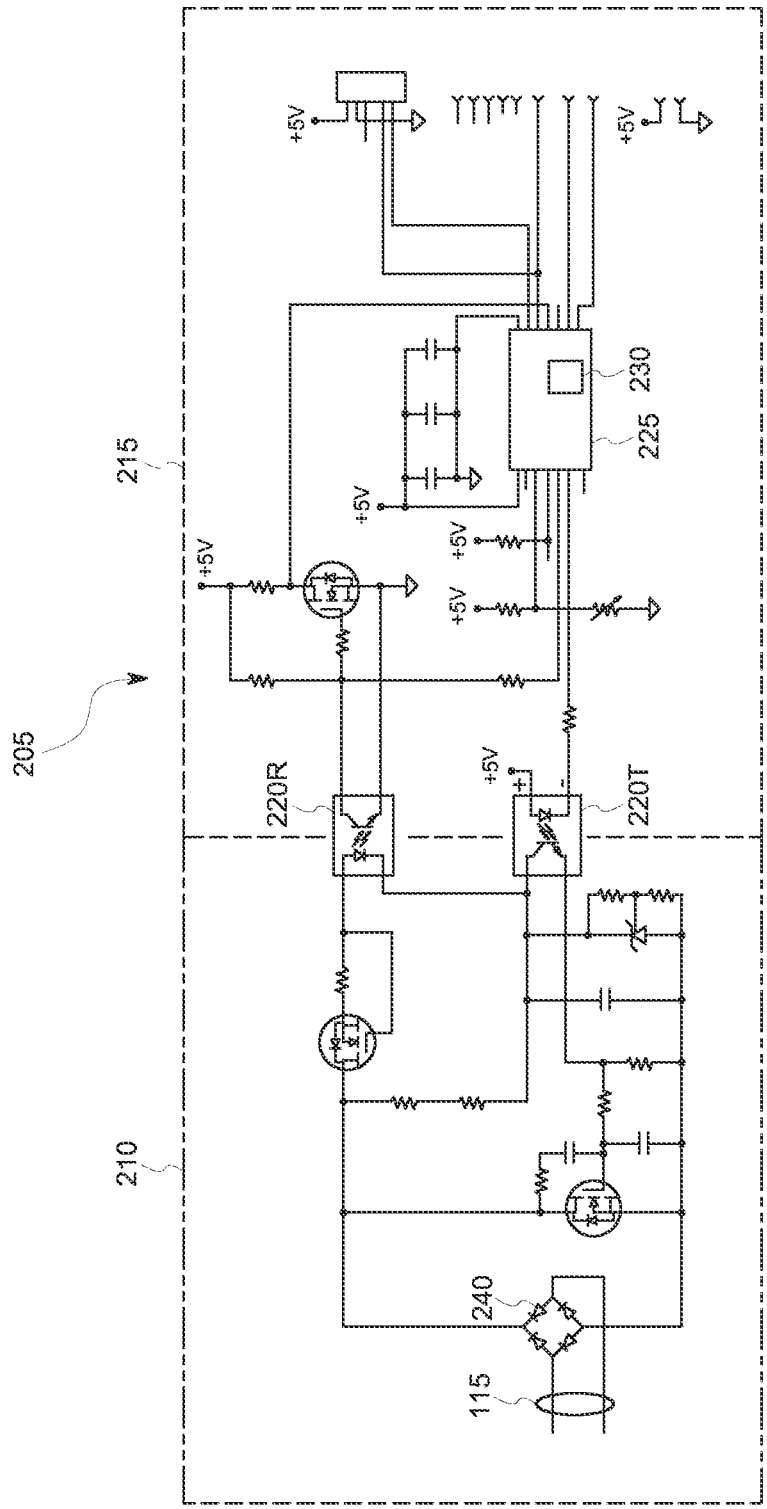
FIG. 2 shows a schematic diagram of at least a portion of an exemplary prior art DALI control gear.
Figure 3:
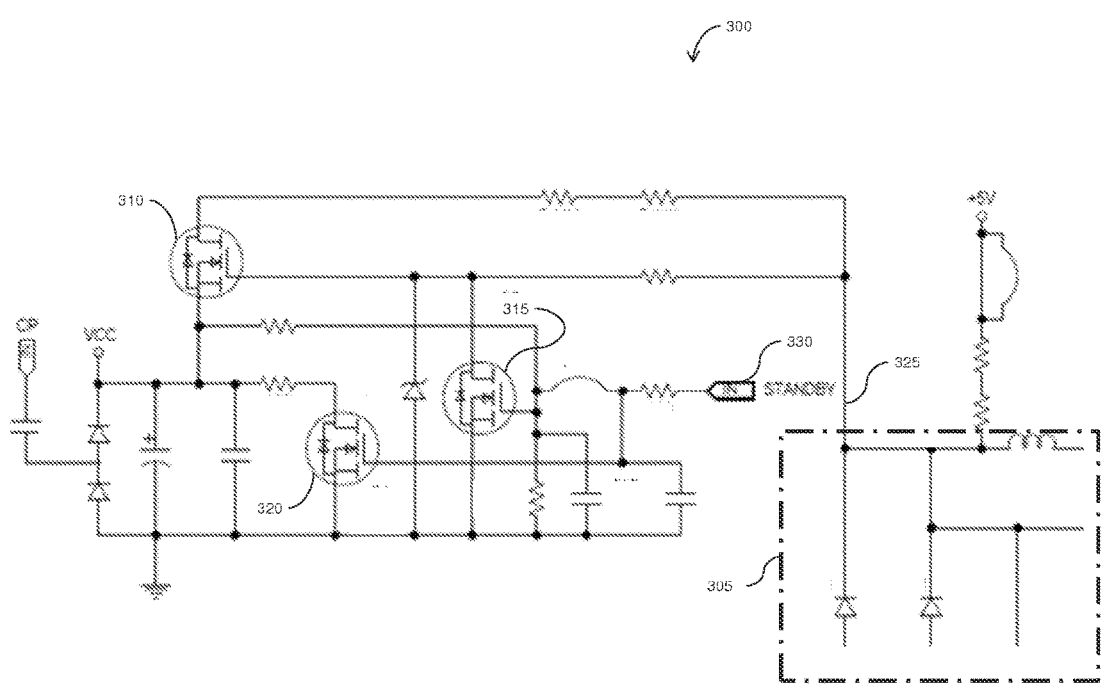
FIG. 3 shows a schematic diagram of at least a portion of an exemplary prior art DALI control gear power supply.

The power supplies 400, 500 generally provide power to control circuitry, for example DALI drivers, to accommodate control circuitry initialization within a predetermined time. The power supplies also provide for reduced power consumption during stand-by mode. The disclosed structures and methods allow selection of the components of the power supplies for compliance with DALI standards for initialization time and for standby power consumption. Using strategic switching and stand-by control, the disclosed embodiments are able to both supply power to the control circuitry and power down during stand-by mode below DALI power consumption standards, for example, a power consumption of less than 0.5 W. Stand-by mode may include providing power to certain components to maintain communication capabilities between the control gear 110 and the application controller 105 (FIG. 1), for example, for system restart or any other commands that may be sent.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A power supply comprising:
an output configured to supply current and voltage to control circuitry;
a first component arrangement configured to provide a first current and voltage to the output while a processor of the control circuitry initializes; and
a second component arrangement configured to provide a second current to the output, lower than the first current output, when the initialization of the processor is complete.

2. The power supply of claim 1, wherein the control circuitry comprises digital addressable lighting interface control gear circuitry.

3. The power supply of claim 1, wherein components of the first component arrangement are selected to provide a predetermined initialization time.

4. The power supply of claim 1, wherein the first and second component arrangements are resistor networks.

5. The power supply of claim 1, further comprising a switch for selecting between the first and second component arrangements.

6. The power supply of claim 5, further comprising switching circuitry for controlling the switch to select the first component arrangement upon an application of power to the control circuitry, and to select the second component arrangement when the initialization of the processor is complete.

7. The power supply of claim 6, wherein the switching circuitry is configured to control the switch to select the second component arrangement upon receiving a standby mode signal.

8. The power supply of claim 1, wherein the second component arrangement is configured to provide the second current to the output to cause the control circuitry to operate at a reduced power consumption while maintaining a communication capability.

9. A method of operating a power supply comprising:
providing an output configured to supply current and voltage to control circuitry;
connecting a first component arrangement of the power supply configured to provide a first current and voltage to the output while a processor of the control circuitry initializes; and
connecting a second component arrangement of the supply to provide a second current to the output, lower than the first current output, when the initialization of the processor is complete.

10. The method of claim 9, wherein the control circuitry comprises digital addressable lighting interface control gear circuitry.

11. The method of claim 9, comprising selecting components of the first component arrangement to provide a predetermined initialization time.

12. The method of claim 9, wherein the first and second component arrangements are resistor networks.

13. The method of claim 9, further comprising:
selecting the first component arrangement upon an application of power to the control circuitry; and
selecting the second component arrangement when the initialization of the processor is complete.

14. The method of claim 9, further comprising selecting the second component arrangement upon receiving a standby mode signal.

15. The method of claim 9, further comprising selecting the second component arrangement to provide the second current to the output to cause the control circuitry to operate at a reduced power consumption while maintaining a communication capability.

* * * * *